(12) United States Patent
Rodriguez et al.

(10) Patent No.: US 12,708,234 B2
(45) Date of Patent: Aug. 18, 2026

(54) SYSTEM AND METHOD FOR ADJUSTING THE DEPTH OF PARALLELIZATION FOR RECIPE PROGRAM EXECUTION

(71) Applicant: Vorwerk & Co. Interholding GmbH, Wuppertal (DE)

(72) Inventors: Beatriz Rodriguez, Madrid (ES); Stefan Kraut-Reinkober, Leverkusen (DE); Niklas Van Teeffelen, Düsseldorf (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 1141 days.

(21) Appl. No.: 17/655,104

(22) Filed: Mar. 16, 2022

(65) Prior Publication Data

US 2022/0296038 A1 Sep. 22, 2022

(30) Foreign Application Priority Data

Mar. 16, 2021 (EP) .................................... 21162909

(51) Int. Cl.

*A47J 36/32* (2006.01)
*A47J 27/00* (2006.01)
*A47J 27/62* (2006.01)

(52) U.S. Cl.

CPC ........... *A47J 36/321* (2018.08); *A47J 27/004* (2013.01); *A47J 27/62* (2013.01)

(58) Field of Classification Search

CPC ........ A47J 36/321; A47J 27/004; A47J 27/62; A47J 36/32; G06F 9/38

See application file for complete search history.

(56) References Cited

U.S. PATENT DOCUMENTS 10,987,643 B1 * 4/2021 Wallace ................ A47J 43/046
2016/0381742 A1 * 12/2016 Banavara ............ H05B 6/6438 99/331
2017/0224149 A1 * 8/2017 Koennings ............ A47J 27/002

FOREIGN PATENT DOCUMENTS

EP 3269280 A1 1/2018
EP 3777620 A1 2/2021

OTHER PUBLICATIONS

Scalable system for smart and federated cooking process IP.com No. IPCOM000243765D IP.com Electronic Publication Date: Oct. 16, 2015 (Year: 2015).*

(Continued)

*Primary Examiner* — Kenneth M Lo
*Assistant Examiner* — Zachary Andrew Cain
(74) *Attorney, Agent, or Firm* — Brake Hughes Bellermann LLP

(57) ABSTRACT

Recipe instructions may be executed by one or more cooking apparatuses, and annotated with one or more device types suitable to execute the respectively annotated recipe instructions. A parallelization constraint associated with a particular cooking user may influences a degree of parallelization of the food preparation with regard to the parallel use of the registered cooking apparatuses. A program analyzer module determines one or more subsets of the registered cooking apparatuses by identifying execution options for the recipe instructions on said one or more subsets resulting in a recipe execution in compliance with the parallelization constraint. The execution option providing a best match with the received parallelization constraint in accordance with predefined matching rules is selected recipe deployment instructions are provided in relation to the respective one or more cooking apparatuses of the selected (Continued)

execution option in accordance with the corresponding annotations for preparing the food product.

20 Claims, 6 Drawing Sheets

(56) References Cited

OTHER PUBLICATIONS

European Search Report for Application No. 21162909.2, mailed on Aug. 13, 2021, 6 pages.
Corrected European Search Opinion for Application No. 21162909.2, mailed on Oct. 19, 2021, 11 pages.

* cited by examiner 280
1
interface 110
281
11
290
291
Recipe program analyzer 120
Execution options 121
S1: (210, 230)
S2: (210, 220, 230)
Partitioning rules 150
Selector 122
S1: (210, 230)
matching rules 123
CA registry 140
Partitioning module 124
130
P1(281/211); P3(281/231)
Control system 100
P1
P3
230
215
DT1
DT2
225
DT3
231
232
211
212
221
222
220
210

281

S

| PL1 | Recipe instructions | Device type (Time) |
|---|---|---|
| 1 | RI1 | DT1(T1) |
| 2 | RI2 | DT1(T2) |
| 3 | RI3 | DT1(T3) / *DT2(T3') / DT4(T3'')* |
| 4 | RI4 | DT1(T4) / *DT2(T4')* |
| 5 | RI5 | DT3(T5) |

F

| PL2 | Recipe instructions | Device type |
|---|---|---|
| 1 | RI1 | DT1(T1) |
| 2 | RI2 | DT1(T2) |
| 3 | RI3 | DT2(T3') |
| 4 | RI4 | DT2(T4') |
| 5 | RI5 | DT3(T5) |

R

| PL3 | Recipe instructions | Device type |
|---|---|---|
| 1 | RI1 | DT1(T1) |
| 2 | RI2 | DT1(T2) |
| 3 | RI3 | DT4(T3'') |
| 4 | RI4 | DT1(T4) |
| 5 | RI5 | DT3(T5) |

VF

| PL4 | Recipe instructions | Device type |
|---|---|---|
| 1 | RI1 | DT1(T1) |
| 2 | RI2 | DT1(T2) |
| 3 | RI3 | DT4(T3'') |
| 4 | RI4 | DT2(T4') |
| 5 | RI5 | DT3(T5) |

| PLg | Recipe instructions | Device type (Time) | Group |
|---|---|---|---|
| 1 | RI1 | DT1(T1) | G1 |
| 2 | RI2 | DT1(T2) | G1 |
| 3 | RI3 | DT1(T3) / DT2(T3‘) / DT4(T3“) | G2 |
| 4 | RI4 | DT1(T4) / DT2(T4‘) | G3 |
| 5 | RI5 | DT3(T5) | G4 |

TEO1

| EO1 | Recipe instructions | Device type | Group | Time |
|---|---|---|---|---|
| 1 | RI1 | DT1 | G1 | T1 |
| 2 | RI2 | DT1 | G1 | T2 |
| 3 | RI3 | DT1 | G2 | T3 |
| 4 | RI4 | DT1 | G3 | T4 |
| 5 | RI5 | DT3 | G4 | T5 |

TEO2

| EO2 | Recipe instructions | Device type | Group | Time |
|---|---|---|---|---|
| 1 | RI1 | DT1 | G1 | T1 |
| 2 | RI2 | DT1 | G1 | T2 |
| 3 | RI3 | DT2 | G2 | T3‘ |
| 4 | RI4 | DT2 | G3 | T4‘ |
| 5 | RI5 | DT3 | G4 | T5 |

FIG. 3B

SYSTEM AND METHOD FOR ADJUSTING THE DEPTH OF PARALLELIZATION FOR RECIPE PROGRAM EXECUTION

CROSS-REFERENCE TO RELATED APPLICATIONS

The application claims priority to EP Patent Application No. 21162909.2, filed on Mar. 16, 2021 and entitled "System and method for adjusting the depth of parallelization for recipe program execution," the disclosure of which is hereby incorporated by reference in its entirety.

TECHNICAL FIELD

The present description generally relates to cooking apparatuses, and more particularly, relates to adjusting the depth of parallelization for executing recipe program instructions under given parallelization constraints.

BACKGROUND

Cooking apparatuses (cooking devices) have become more and more intelligent in the recent past by integrating multiple cooking functions into a single cooking apparatus. For example, modern cooking devices integrate functions, such as heating, mixing, boiling, pureeing, etc., in a single multi-function cooking device. A cooking device typically has to be operated with appropriate technical parameter settings (e.g., temperature settings, rotational speed settings, etc.) to ensure proper operation. Proper operation of a cooking device as used hereinafter refers to correct, safe and/or secure operation for producing reproducible cooking results with the cooking apparatus with regards to a particular food product.

Typically, the functions of such a multi-function cooking apparatus are controlled by one or more recipe programs which have instructions that are sequentially executed to arrive at the prepared food product or menu. For example, a recipe program can be loaded into the cooking apparatus for preparing a certain course of a menu and multiple courses can be prepared by processing respective recipe programs in a corresponding sequence. However, a recipe program may also include program instructions related to food processing steps of two or more courses (or an entire menu). Food products resulting from such complex food processing steps are referred to as complex food products herein. The processing of such complex food processing steps may involve the use of a plurality of cooking apparatuses to allow for parallel execution of certain recipe instructions on multiple cooking apparatuses.

SUMMARY

There is therefore a need to enable the provisioning of recipe instructions in relation to one or more cooking apparatuses for preparing a food product with cooking apparatuses available in the cooking environment of the cooking user. The cooking apparatuses may be of different device types supporting different cooking functions. This is achieved by a dynamic adjustment of the depth of parallelization for recipe program execution when using a plurality of cooking apparatuses in parallel to meet a parallelization constraint associated with a user for the preparation of the food product. The parallelization constraint may be different for different types of cooking users dependent on the desired cooking experience by the respective user.

The desire for provisioning recipe instructions to multiple cooking apparatuses may be motivated by:

- a user desire to shorten the overall cooking time (recipe execution time) through simultaneous execution of different groups of recipe instructions on different cooking apparatuses,
- a user desire to influence the degree of automation of the cooking steps through the use of cooking apparatuses supporting a respective degree of automation, and
- a user desire to improve the user perceived quality of food products through the use of specialized cooking apparatuses which provide cooking results for particular cooking functions in compliance with the user's quality expectations.

The above problem is solved by embodiments as claimed by the independent claims: a computer-implemented method for recipe instruction provisioning in relation to one or more registered cooking apparatuses for preparing a food product, a computer program product with recipe instructions configured to cause execution of said method when executing the computer program method, and a computer system which can load and executed saic computer program product to execute said method.

Typically, cooking apparatuses used in a joint cooking process for preparing a food product are under the control of a control system which deploys respective partitions of the recipe program to the involved cooking apparatuses for execution, and which provides recipe instructions to the user if such instructions are to be manually executed by the user. Typically, such cooking apparatuses include apparatuses of different device types (e.g., refrigerator, oven, microwave, or multi-function cooking apparatuses with different functional scopes—i.e., support of different cooking functions—, etc.)

The control system can be a separate system which is communicatively coupled with one or more of the cooking apparatuses, or it may be an integral component of one of the cooking apparatuses (lead apparatus). The control system determines which of the other cooking apparatuses are to be used for execution of respective recipe instructions. Multi-function cooking apparatuses of different device types may, for example, support different maximum cooking temperatures with their respective heating elements and heat controller, or different maximum rotational speeds of their stirring/chopping elements with their respective motors and motor control elements. It is to be noted that "cooking function" as used herein refers to any action which can be performed by a cooking apparatus in the course of processing recipe instructions. That is, a cooking function does not necessarily involve a heating step. Also functions such as chopping or stirring are referred to as cooking functions.

The computer system for recipe instruction provisioning in relation to one or more registered cooking apparatuses is communicatively coupled with one or more registered cooking apparatuses. Each cooking apparatus is of a particular device type. There can be multiple registered cooking apparatuses of the same device type. A registry accessible by the control system provides the information about the available cooking apparatus. An available cooking apparatus is registered in the registry together with its device type. This ensures that all cooking apparatuses which are available for recipe execution are known by the control system.

The system has an interface to receive a recipe program file with machine readable recipe instructions for preparing the food product. Typically, such recipe program files are provided by a remote recipe server which can be accessed by the control system via wide area network such as the Internet. However, recipe files may also be provided by wearable or portable storage media, such as for example, a USB stick, a DVD, or the like, which is then connected to the control system do download the recipe file into a corresponding memory of the control system.

In particular with recipes for complex food products, the recipe instructions are configured to be executed by one or more cooking apparatuses in that the recipe instructions are annotated with one or more device types suitable to execute the respectively annotated recipe instruction. In other words, the recipe instructions of such a recipe program include metadata which specify which device types are appropriate to execute a particular recipe instruction. The recipe program file may also include recipe instructions which are not dependent on a particular apparatus but which are directed to manual tasks to be performed by the user (e.g., preparing cooking ingredients). However, for such manual recipe instructions, a deployment to the one or more cooking apparatuses is not necessary.

Further, the system has an interface to receive a parallelization constraint associated with a particular cooking user. The parallelization constraint is configured to influence the degree of parallelization of the food preparation with regard to the parallel use of the one or more registered cooking apparatuses. It is to be noted that in case recipe instructions can be provisioned to multiple cooking apparatuses, typically at least some of those instructions can be executed in parallel, whereas when using a single cooking apparatus, all instructions which require the use of the cooking apparatus are necessarily executed sequentially (only manual steps may be performed in parallel). Parallel use, as used herein, therefore relates to the cooperative use of multiple cooking apparatuses when jointly executing a recipe program with certain partitions of the recipe program being distributed to the respective cooking apparatuses. For example, the parallelization constraint may specify a user defined preparation time for the food product, or a user defined device support-level specifying a degree of automation for semi-automated cooking, or a user defined device flexibility-level specifying potential use of specialized cooking devices. A specification for a user defined preparation time may also be given by a representation of relative time related expressions, such as, “slow”, “relaxed”, “fast”, etc. A specification for a user defined device support-level for semi-automated cooking may be given, for example, by specifying an acceptable maximum number of manual cooking steps in the recipe program, or by relative automation related expressions specifying anything between manual cooking and automated cooking. Examples for such relative terms are “low automation”, “high automation”, etc. A specification for a user defined device flexibility-level specifying potential use of specialized cooking devices may be given as relative terms regarding the device type variety to be used for the recipe execution. For example, a user may specify a flexibility constraint by terms such as “healthy”, “crispy” or the like. For example, if a specialized device type allows to execute a frying step with less fat/oil than a standard device type, the specialized device type may be associated with the flexibility-level “healthy” for respective cooking functions and the system would select execution options using the specialized device type in compliance with a corresponding flexibility-level constraint. A further specialized device type may be associated with the flexibility-level “crispy” for a particular cooking function. In case a flexibility-constraint value “crispy” is associated with the user, the system would select execution options with this further device type.

The parallelization constraint may be received as a direct input provided by the cooking user via a respective user interface. Alternatively, the parallelization constraint may be retrieved from a stored user profile of the cooking user after the user has logged into the control system.

A program analyzer module of the system determines one or more subsets of the registered cooking apparatuses by identifying execution options for the recipe instructions on said one or more subsets. Thereby, each possible sequence of recipe instructions when being executed by the annotated device types is considered as an execution option. For example, for a recipe with two recipe instructions RI1, RI2 with the following device type annotations RI1: DT1, DT2, and RI2: DT1, DT3, the following execution options are possible: RI1(DT1)-RI2(DT1); RI1(DT1)-RI2(DT3); RI1(DT2)-RI2(DT1); and RI1(DT2)-RI2(DT3). Assuming that the registry includes a first cooking apparatus of device type DT1 and a second cooking apparatus of device type DT2, then the subsets determined by the program analyzer as are: (DT1) and (DT1, DT2) with the corresponding execution options RI1(DT1)-RI2(DT1) and RI1(DT2)-RI2(DT1). The device type annotations of the recipe instructions are thereby used as a filter criterion to eliminate all execution options for the recipe program which require device types not represented by the registered cooking appliances. Of course, such execution options would not be executable by the user’s equipment.

The execution options RI1(DT1)-RI2(DT1) requires only DT1 but does not allow for parallelization because only a single cooking apparatus is used for sequential processing of the recipe instructions RI1, RI2. It is assumed that the output of RI1 is not needed as an input to RI2. In such case the execution option RI1(DT2)-RI2(DT1) allows for parallel use DT2 and DT1 which reduces the overall preparation time of the food product.

The program analyzer also ensures that the determined subset(s) can guarantee a recipe execution in compliance with the parallelization constraint. Assuming that the parallelization constraint relates to a preparation time constraint of the user, for example, the user may have set a time constraint of 20 minutes for the food preparation. In this case, it is assumed that execution option RI1(DT1)-RI2(DT1) takes 23 min while the parallel execution option RI1(DT2)-RI2(DT1) only requires 19 min of food processing time. To enable the program analyzer to select the execution option with the subset providing a best match with the received parallelization constraint, predefined matching rules are evaluated by the program analyzer. Such matching rules are typically part of the user profile. For example, the user may specify that in case of a time constraint it is desired that the time constraint is treated by the system as a maximum time, a minimum time or the time to which the actual preparation time should be closest. If the time constraint of 20 min is treated as the maximum cooking time, the program analyzer selects the subset (DT2, DT1) for the parallel execution option RI1(DT2)-RI2(DT1) as the best match. This would also be selected by the matching rule where the selected execution comes closest to the given time constraint. However, if the matching rule interprets the time constraint as the minimum time (e.g., “slow” cooking is preferred), then the subset (DT1) for the sequential execution option RI1(DT1)-RI2(DT1) is selected.

A deployment module provides the corresponding recipe deployment instructions in relation to the respective one or more cooking apparatuses of the selected execution option in accordance with the corresponding annotations for preparing the food product. In the above example, in case the execution option with the subset (DT2, DT1) is selected, RI1 is deployed to DT2, and RI2 is deployed to DT1. In case execution option with the subset (DT1) is selected, RI1 and RI2 are deployed to DT1. In case that RI1 and RI2 are machine readable instructions which can directly be processed by the respective cooking apparatuses, the control system can send the instructions directly to the respective receiving cooking apparatuses via an appropriate communication link (e.g., LAN, WLAN, Bluetooth, or any other appropriate communication channel). If no direct machine-to-machine communication is possible, the respective deployment instructions are provided to the user to be manually applied to the respective receiving cooking apparatus. For example, a display unit of the control system may show the corresponding instructions to the user.

In one embodiment, the recipe program file includes predefined alternative program listings of the recipe program. Each alternative program listing is related to a particular combination of cooking apparatuses with corresponding device type annotations. In other words, the alternative listings correspond to various execution options suitable to be executed on respective cooking apparatuses in accordance with the device annotations of the recipe instructions. In the above example, for each execution option RI1(DT1)-RI2(DT1), RI1(DT1)-RI2(DT3), RI1(DT2)-RI2(DT1), and RI1(DT2)-RI2(DT3) the corresponding program listing is included in the recipe program file. To determine one or more subsets of the registered cooking apparatuses the program analyzer selects the alternative program listings with combinations that only include registered cooking apparatuses. That is, in the above example, with the registered cooking equipment of the user only including DT1 and DT2 cooking apparatuses, the program analyzer discards the program listings associated with the execution options RI1(DT1)-RI2(DT3) and RI1(DT2)-RI2(DT3) because they could not be executed by the available equipment.

In this embodiment, the alternative program listings in the recipe program file are annotated with corresponding parallelization constraint metadata in accordance with parallelization constraint preferences of stored user profiles. For example, the program listing for execution option RI1(DT1)-RI2(DT1) may be annotated with a representation of a predicted preparation time of 23 min for this alternative program listing, whereas the program listing for the parallel execution option RI1(DT2)-RI2(DT1) may be annotated with the predicted preparation time of 19 min. With regard to the parallelization constraint of the device support-level, the parallelization constraint metadata may include a representation of an associated support-level. For example, the degree or level of automation in the food preparation process may be higher when using the sequential execution option RI1(DT1)-RI2(DT1) because less manual steps may be required with regard to moving actions required in the parallel execution option RI1(DT2)-RI2(DT1). The sequential program listing may therefore be annotated with "high automation degree" whereas the parallel program listing may be annotated with "low automation degree". With regard to the parallelization constraint device flexibility-level, DT2 may be a cooking apparatus which has a certain cooking capability that is particularly advantageous for performing RI1. Therefore, the parallel execution option has a higher device flexibility in this regard as it uses DT2 for RI1 and DT1 for RI2. As a consequence, the parallel program listing may be annotated with "high device flexibility" whereas the sequential program listing may be annotated with "low device flexibility".

It is to be noted that real program listings may include a large number of recipe instructions (e.g., >>10) which may be executed by a relatively large number of cooking apparatuses (e.g., >5). In such situations, a large number of alternative program listings would be needed to cover all kinds of execution options in predefined program listings. Therefore, an alternative embodiment of the program analyzer may be used which can determine execution options at runtime based on single generic recipe program description in the recipe program file.

In this alternative embodiment, the recipe program file has a program listing which indicates groupings of recipe instructions. The recipe instructions of a particular grouping are to be executed by one cooking apparatus in accordance with the corresponding annotations. In the embodiment, the program analyzer has a partitioning module which identifies execution options for the recipe instructions based on predefined partitioning rules. Such partitioning rules can check the various groupings to determine which grouping can be assigned to which cooking apparatus (device type) in view of the parallelization constraint. For example, preparation times may be computed for various execution options executed by various combinations of cooking apparatuses in accordance with the annotations. Then, the program analyzer may select the execution option having the best match with the corresponding parallelization constraint (time constraint).

In another dimension, degrees of automation may be determined for various execution options executed by various combinations of cooking apparatuses in accordance with the annotations. For example, the program analyzer may select the execution option with a corresponding number of manual activities (or with a corresponding time effort in manual activities) while taking into account the respective groupings and the given device automation constraint. In case the parallelization constraint indicates the user's desire for the highest degree in automation for a particular recipe, the program analyzer may select the execution option with the lowest number of manual activities (or with the lowest time effort in manual activities).

In yet another dimension, degrees of device flexibility may be determined by the program analyzer for various execution options executed by various combinations of cooking devices in accordance with the annotations. For example, if the user prefers a high degree of flexibility the program analyzer may identify the execution option making use of the most different device types for the food processing din accordance with the respective groupings.

In summary, the identified execution options can be mapped to parallelization constraint preferences directly received as user inputs or stored in respective user profiles in accordance with predefined mapping rules. Such mapping rules are configured such that the recipe program is checked whether the recipe instructions can be divided into partitions which can then deployed to one or more of the registered cooking apparatuses to comply with parallelization constraint.

The above functions of the control system are executed as a computer-implemented method for recipe instruction provisioning in relation to one or more registered cooking apparatuses for preparing a food product, with the various steps being executed in an appropriate order as described in more detail in the detailed description.

Thereby, in one embodiment, a respective computer program product with computer readable instructions is loaded into a memory of the control system and executed by at least one processor of the control system, thus causing the computing device to perform the computer-implemented method for performing the herein described functions of the control system.

Further aspects of the description will be realized and attained by means of the elements and combinations particularly depicted in the appended claims. It is to be understood that both the foregoing general description and the following detailed description are exemplary and explanatory only.

BRIEF DESCRIPTION OF THE DRAWINGS

FIGS. 3A, 3B illustrate two example implementations of recipe partitioning in line with execution options;

DETAILED DESCRIPTION

Figure 1:
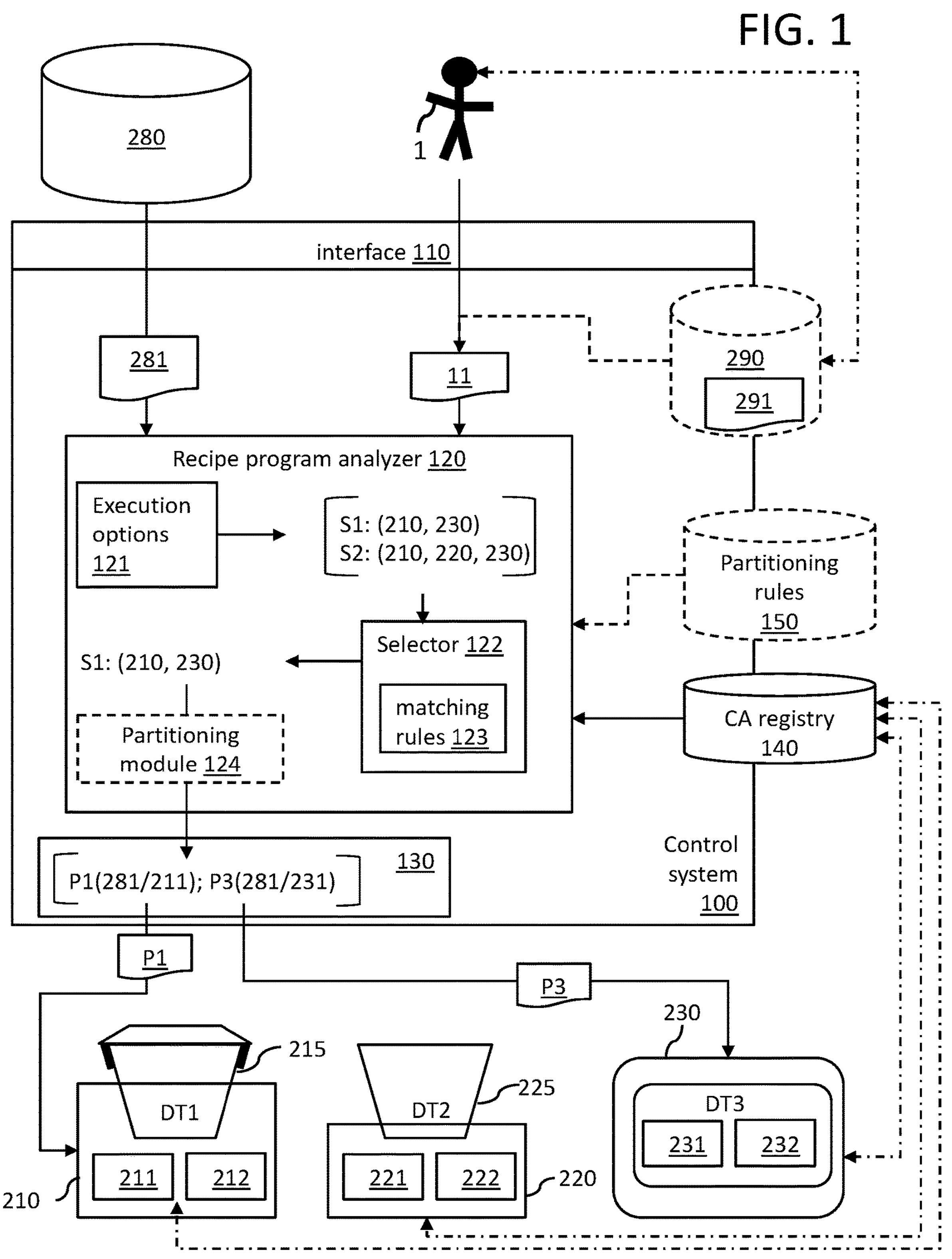
FIG. 1 illustrates a block diagram including a control system for recipe instruction provisioning in relation to one or more registered cooking apparatuses for preparing a food product according to an embodiment.
Figure 2:
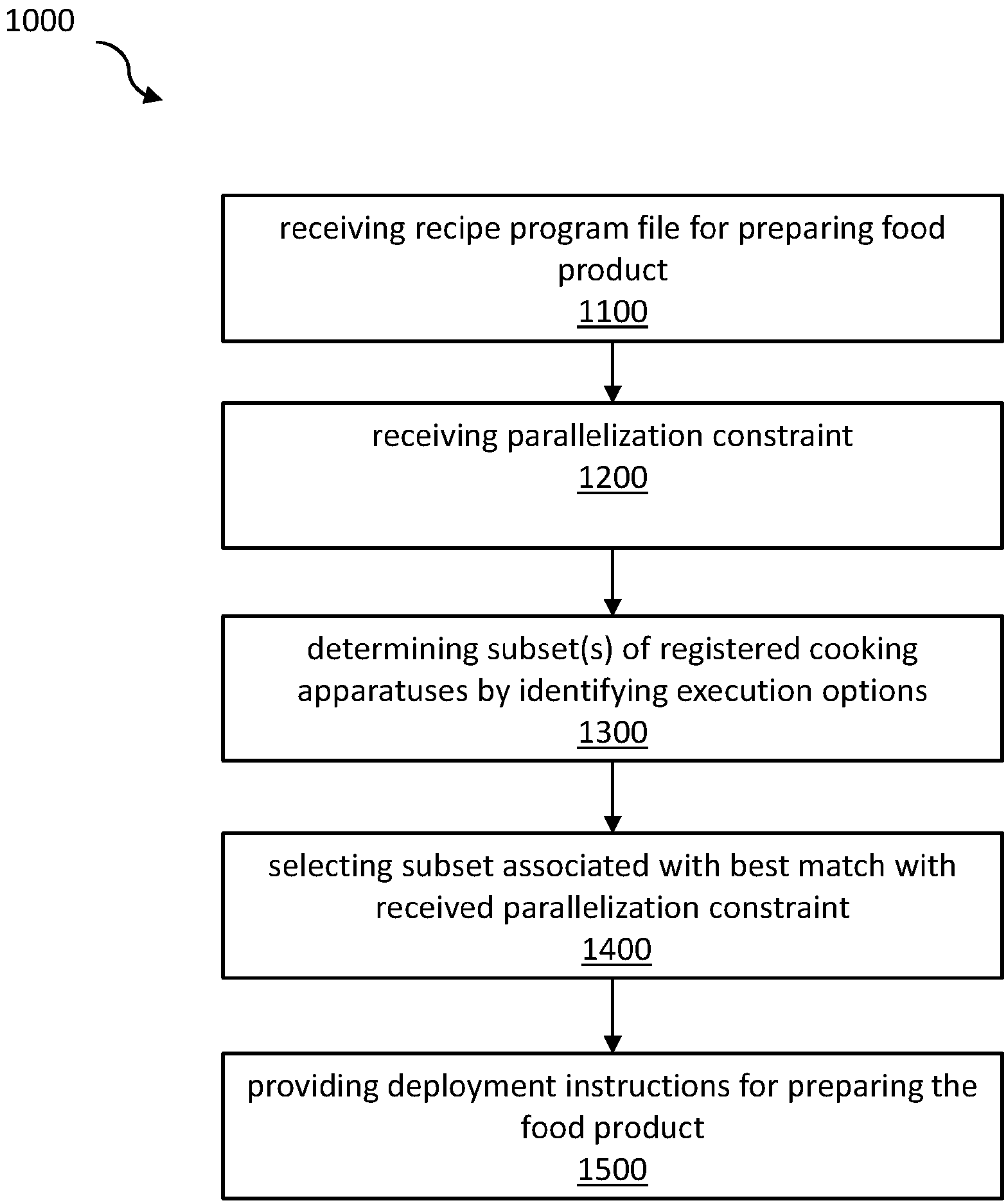
FIG. 2 is a simplified flow chart illustrating a computer-implemented method for recipe instruction provisioning in relation to one or more registered cooking apparatuses for preparing a food product according to an embodiment.

FIG. 1 illustrates a block diagram including a control system 100 for recipe instruction provisioning in relation to one or more registered cooking apparatuses 210, 220, 230 for preparing a food product according to an embodiment. FIG. 2 is a simplified flow chart of a computer implemented method 1000 for recipe instruction provisioning in relation to one or more registered cooking apparatuses for preparing a food product according to an embodiment. FIG. 1 is described now in the context of FIG. 2. For this reason, reference numbers of FIG. 1 and FIG. 2 are used in the following description.

In the example of FIG. 1, the control system 100 (implemented by a computer system) is communicatively coupled with a recipe storage 280. The recipe storage 280 can also be an integral component of the system 100, or it may be a remote data storage system accessible via the interface 110. The recipe storage 280 stores a plurality of recipe program files with machine readable recipe instructions for preparing food products. Typically, a cooking user 1 can select a particular recipe for preparing a particular food product while interacting with the control system 100. For interaction with the user 1, the interface 110 also implements a suitable user interface. Once the user 1 has made a selection of a particular food product to be prepared, the control system receives 1100 the associated recipe program file 281 (e.g., via a download of the recipe program file from the recipe storage 280).

The recipe program file 281 includes recipe instructions which are configured to be executed by one or more cooking apparatuses in that each recipe instruction is annotated with one or more device types suitable to execute the respectively annotated recipe instruction. Thereby, the recipe program file may include all kinds of possible device type options for respective recipe instructions. The user 1 does not necessarily command cooking apparatus (CA) of all such device types which are listed as options in the recipe program file. In the example, the user's cooking environment provides a multi-function apparatus 210 of device type DT1 (supporting a broad range of cooking functions 212), a simpler version of a multi-function cooking apparatus 220 of device type DT2 (supporting a smaller range of cooking functions 222), and an oven 230 of device type DT3 (supporting cooking functions 323 that may differ from the other cooking function). All cooking apparatuses which are available in the user's cooking environment for food preparation are registered (dash-dotted double arrows) in a CA registry 140. The CA registry 140 may be an integral part of control system 100, or it may be accessible by the system 100 on a remote storage device.

In the example, DT1 and DT2 are compatible in the sense that they provide receipts (e.g., connectors, mechanical interfaces, holders) configured to insert the same type of bowls or vessels. That is, the bowl (or vessel) 215 (with a lid) of CA 210 can equally be inserted into CA 220, and bowl (or vessel) 225 of CA 220 can equally be inserted into CA 210. Each of the cooking apparatuses 210, 220, 230 has a respective recipe execution module 211, 221, 231. The recipe execution modules are configured to execute recipe instructions on the respective CA to perform corresponding cooking functions 212, 222, 232. It is to be noted that "cooking function" as used herein refers to any action which can be performed by a cooking apparatus in the course of processing recipe instructions. That is, a cooking function does not necessarily involve a heating step. Cooking functions include but are not limited to functions such as heating, boiling, frying, steaming, baking, weighing, chopping, mixing, whipping, stirring, etc. Thereby, each CA may be of a different device type and support a different subset of cooking functions associated with the respective device type. The cooking functions are implemented via respective hardware components. For example, the stirring and chopping functions are implemented with a motor and a motor control function driving a chopping/stirring element. The heating function is implemented with a heater and a heat control function. The skilled person knows how other cooking functions of a multifunction cooking apparatus can be implemented. Typically, the hardware control functions process sensor data which monitor the respective function parameters, such as for example, data received from a rotational speed sensor for the motor control, or from a temperature sensor for the heater control.

The recipe instructions may be directly deployed to a CA via a machine-to-machine communication between the control system 100 and the CA. In the example of FIG. 1, a partition P1 of the recipe program file 281 with recipe instructions directed to CA 210 is directly deployed to CA 210 by the deployment module 130 of the system 100 via machine-to-machine communication. Such partitions may be already predefined in the received recipe program file 281, or they may be dynamically generated by a partitioning module 124 using predefined partitioning rules.

In the example, deployment module 130 also provides a partition P3 with recipe instructions directed to the oven 230. It is assumed that there is no machine-to-machine communication between the control system 100 and the oven. Instead, the oven needs to be manually operated by the user 1. In this case, the deployment instructions of P3 are provided to the user to operate the oven accordingly.

The control system 100 further receives 1200 a parallelization constraint 11 associated with the cooking user 1. In one implementation, the user may directly enter the parallelization constraint 11 as an input to the control system via the user interface which enables the user 1 to interact with the control system 100. Any appropriate user interface technology (e.g., keyboard, touch screen, audio input, etc.) may be used. The user interface may be implemented as an integral part of the control system or it may be implemented on a remote, communicatively coupled front-end device (e.g., a smartphone or tablet computer), for example by an application which allows the front-end device to interact with the control system. In an alternative implementation, the user 1 logs into the control system 100. Once logged in, a user profile 291 of the user 1 is retrieved from a user database 290. The user profile 291 includes the user's parallelization constraint(s) 11. Thereby a parallelization constraint 11 specifies any of the following: a user defined preparation time for the food product, a user defined device support-level for semi-automated cooking, and a user defined device flexibility-level specifying potential use of specialized cooking devices. In case a user profile includes multiple parallelization constraints (e.g., in different dimensions, such as a time constraint "slow", a support-level constraint "low automation", and a flexibility-level constraint specifying one or more specialized cooking devices) the user may select via the user interface which parallelization constraint is to be used for the currently selected recipe program file 281. Alternatively, the user profile may define a default parallelization constraint for the user if no selection is made. The parallelization constraint finally influences the degree of parallelization of the food preparation with regard to the parallel use of the registered cooking apparatuses 210, 220, 230 in that a recipe program analyzer module 120 of the control system determines an execution option for the recipe execution involving one or more subsets of the registered cooking apparatuses which are appropriate to comply with the given parallelization constraint 11.

For that purpose, the program analyzer module 120 firstly determines 1300 one or more subsets S1, S2 of the registered cooking apparatuses by identifying execution options 121 for the recipe instructions on said one or more subsets resulting in a recipe execution in compliance with the given parallelization constraint 11. Execution options 121 may already be predefined as alternative program listings in the recipe program file 281 (cf. FIG. 3A), or they may be dynamically derived from a generic program listing based on the annotations of the recipe instructions. At this stage, already all execution options associated with the recipe program file 281 requiring a device type which is not amongst the device types of the registered cooking apparatuses are eliminated from further consideration. That is, executions options which cannot be executed with the cooking equipment of the user 1 are discarded.

Secondly, a selector function 122 of the program analyzer 120 selects 1400 the subset S1 providing a best match with the received parallelization constraint 11 in accordance with predefined matching rules 123. Thereby, the matching rules 123 may be derived from the user profile of the user 1. Example of the matching rules 123 may include, but are not limited to:

in case of a particular time constraint, select the subset which enables the execution option with an execution time that is closest to the execution time associated with the given time constraint;

in case of a particular time constraint, select the subset which enables the execution option with an execution time that is closest to and not longer than the execution time associated with the given time constraint;

in case of a particular time constraint, select the subset which enables the execution option with an execution time that is closest to and not shorter than the execution time associated with the given time constraint;

in case of a particular support-level constraint, select the subset which enables the execution option which limits the number of manual cooking activities in accordance with the given support-level constraint; and in case of a particular flexibility-level constraint, select the subset which enables the execution option which uses a number of different device types of specialized cooking devices in accordance with the given flexibility-level constraint.

In the example of FIG. 1, it is assumed that the program analyzer 120 identifies execution options which can be enabled by two different CA subsets of the registered CAs. The first subset S1 includes the multifunction CA 210 (DT1) and the oven 230 (DT3), whereas the second subset S2, in addition to CA 210, 230, further includes CA 220 (DT2). It is assumed in the example that the execution option enabled by S2 allows parallel execution of some recipe instructions by using CA 210 and CA 220 in parallel, whereas S1 performs these recipe instructions sequentially on CA 210. As a consequence, the execution option enabled by S2 allows a faster food preparation than the execution option S1. Assuming now that parallelization constraint of the user is a time constraint as which indicates that the user prefers a "long" or "slow" cooking experience, then the selector 122 identifies the best match with this parallelization constraint for execution option S1 as it is associated with the longest preparation time.

Assuming that the user is under time pressure and inputs a desired parallelization constraint "no longer than 20 min", and further assuming that the execution time by S1 is 21 min and the execution time by S2 is 17 min, then the selector 122 would have selected the parallel execution option associated with S2.

In another example, the parallelization constraint 11 may be a support-level constraint indicating the user's desire to maximize the degree of cooking automation by "minimizing the number of manual steps". Assuming that the execution option using S1 requires a plurality of manual cleaning steps of the bowl or vessel (because the respective cooking steps are all executed by CA 210), and that the execution option using S2 allows to avoid such manual cleaning steps by using two different bowls 215, 225, the selector 122 will select the execution option enabled by S2 which has the best match with the constraint "minimizing the number of manual steps" in accordance with the respective matching rule.

In another example, the parallelization constraint 11 may be a flexibility-level constraint indicating the user's desire to always use as much specialized cooking apparatuses as possible. The use of specialized CAs may improve the quality of the cooking result for certain cooking functions. For example, when the recipe program includes instructions for a cooking step "searing a piece of meat", the corresponding device type annotations may provide for optional use of a standard multi-function cooking apparatus where the searing is done in the heated CA bowl. In an alternative execution option, the use of an oven with a high-temperature grill cooking function for searing is enabled with a corresponding device type annotation. A third alternative option may be the use of an oven with an automatic steam function typically leads to a crispy crust of the meat. In this example, two of the alternatives make use of a specialized cooking apparatus. For example, a flexibility-level constraint in the user profile may indicate a preference of the user for crispy food. In this case, the execution option using the oven with the automatic steam function would be preferred. In general, flexibility-level annotations may be associated with alternative program listings making use of the respective specialized cooking apparatuses, or they may be associated with the device types of such specialized cooking devices. In both cases, the selector can select an appropriate execution option in accordance with the received parallelization constraints.

In the example of FIG. 1, the selected execution option (enabled by S1) is then deployed to the respective CAs 210, 230. In one implementation, the respective partitioning into partition P1 with recipe instructions of the recipe program 281 to be executed by the execution module 211 of CA 210, and partition P3 with recipe instructions of the recipe program 281 to be executed by the execution module 231 of CA 230 is already predefined with corresponding alternative program listings in the recipe program file 281. The recipe instruction in partition P1 may be directly provided 1500 by the deployment module 130 to the execution module 211 via machine-to-machine communication. P3 may be provided 1500 as deployment instructions to the user 1 (via the user interface) to instruct the user on how to operate the oven 230. Once the user has entered the corresponding recipe instruction as input for the CA 230, the execution module 231 executes said instructions of P3 and CA 230 performs the corresponding cooking function 232.

In an alternative implementation, the recipe program file may only include a generic recipe program with all cooking steps to be performed for preparing the food product, and annotations (specifying usable device types and corresponding execution times for each recipe instructions) which implicitly specify all possible execution options. In this implementation, the program analyzer 124 has a partitioning module 124 which uses predefined partitioning rules 150 to generate deployable partitions P1, P3 in accordance with the selected execution option. A detailed recipe example is given further down below which demonstrates dynamic identification of execution options and the corresponding partitioning of the recipe program.

FIG. 3A illustrates an example of the first implementation of the recipe program file 281, with the recipe program file already including alternative program listings PL1 to PL4 associated with respective execution options. In the example, each of the program listings PL1 to PL4 includes the recipe instructions RI1 to RI5 and a device type of a device which is suitable executed the respective instructions with an associated execution time noted in brackets. It is to be noted that in a real-world recipe program file, the various program listings can differ with regard to the recipe instructions. For example, a program listing associated with a sequential execution option may include instructions related to the cleaning of a bowl/vessel. Such activities may not be necessary when using a parallel execution option in which case the respective recipe instructions may be omitted in the respective program listing.

Each program listing has a parallelization constraint annotation which, in this example, corresponds to a time constraint. PL1 represents an execution option for slow cooking S. PL2 represents an execution option for fast cooking F. PL3 represents an execution option for relaxed cooking R. PL4 represents an execution option for very fast cooking VF. It is to be noted that, in this implementation, the time constraint which may be received as a user input or retrieved from the user profile does not necessarily need to include an absolute time interval specifying the duration of the entire food processing but can relate to relative terms such as slow, fast, etc., because the execution options are directly annotated with such relative terms. In the example, PL1 is the default listing where the recipe instructions RI1 to RI4 can be executed by a single cooking apparatus of device type DT1. Only RI5 is to be executed by another apparatus of device type DT3 with an execution time T5. That is, PL1 denotes an entirely sequential recipe execution for the recipe instructions RI1 to RI4.

Only for illustration purposes, alternative options for executing RI3 and RI4 are denoted in PL1 in italics separated by slashes in the column "Device type (Time)". In a real program listing of PL1, the alternative options may not be included in this implementation. The alternative options illustrated that RI3 can also be executed by an apparatus of device type DT2 with an execution time T3', or by an apparatus of device type DT4 with an execution time T3". RI4 can also be executed by an apparatus of device type DT2 with an execution time T4'.

PL2 is a program listing which differs from PL1 in that the recipe instructions RI3, RI4 are deployed to the DT2 apparatus. The associated execution time T3'+T4' is supposed to be different from DT1 execution time T3+T4. PL2 is annotated as fast F execution option because RI3 and RI4 can be executed in parallel on the two devices. That is, the overall execution time of the recipe instructions RI1 to RI4 is determined by the longer time interval of T1+T2 and T3'+T4'. In any case, the execution option PL2 I supposed to require a shorter execution time for those instructions than T1+T2+T3+T4 of PL1.

PL3 is a program listing which differs from PL1 in that only recipe instruction RI3 is deployed to the DT4 apparatus. The associated execution time T3" is supposed to be different from DT1 execution time T3. PL3 is annotated as relaxed R execution option because RI3 can be executed in parallel on two devices but most of the cooking RI1, RI2, RI4 is still being executed on the same device in a sequential manner. The use of DT4 for RI3 may be motivated by an elimination of a cleaning activity which makes the cooking process more convenient for the user. However, it is assumed that the gain in overall food processing time is less than for PL2 which reaches a higher degree of parallelization.

PL4 is a program listing which differs from PL1 in that recipe instruction RI3 is deployed to the DT4 apparatus and RI4 is deployed to the DT2 apparatus. In this example, it is assumed that the activities RI3 and RI4 can also be executed in parallel. That is, PL4 uses the highest degree of parallelization amongst the provided execution options. Assuming that T3'+T4'>T1+T2 and T3"<T1+T2 and T4'<T1+T2, then PL4 with the highest degree of parallelization leads to an even shorter food processing time for RI1 to RI4 than PL2 for which reason it is annotated as very fast VF.

In this example, with parallelization constraint annotations directly corresponding to respective parallelization constraints given in the user profiles (or as user input), the matching rules used by the selector can simply check the equality of the given parallelization constraint with the respective annotations of the alternative program listings (execution options) and select the corresponding execution option for deployment. If the user would enter a maximum time for the food processing as parallelization constraint, the selector can compare the cumulated execution times of RI1 to RI5 while taking into account time gains achieved by using CAs in parallel and select the appropriate execution option in accordance with the matching rules (e.g., the execution option with an execution time which is shorter than and comes closest to the given time constraint). For this purpose, the program analyzer may use predefined mappings which can relate a user input to a respective matching rule. For example, providing a maximum time maps to the matching rule to select the execution option with an execution time which is shorter than and comes closest to the given time constraint. Other mappings may be defined by a skilled person to meet the individual preferences of the user.

It is to be noted that each alternative program listing may have an annotation in each dimension of the pallelization constraint. In other words, each program listing can have multiple annotations with one each dimension: a time constraint, a support-level constraint, and a flexibility-level constraint.

FIG. 3B illustrates the second implementation of a recipe program file 282 with dynamic construction of execution options. In this second implementation, the program file includes a generic program listing PLg which provides a generic description of all potential execution options for this recipe program. Again, the example program 282 includes five recipe instructions RI1 to RI5. For each recipe instruction, the column "Device type (Time)" includes device type annotations specifying all execution options for the recipe instruction with the respective execution times. In this regard, the example PLg corresponds to the execution options explained in FIG. 3A for PL1 when including the options in italics.

Further, the generic program listing PLg indicates groupings G1, G2, G3, G4 of recipe instructions, with the recipe instructions of a particular grouping to be executed by one cooking apparatus in accordance with the corresponding device type annotations DT1, DT2, DT3. In other words, recipe instructions assigned to the same group cannot be separated but need to executed sequentially on the same CA. For PLg, RI1 and RI2 are assigned to G1 indicating that both steps need to be sequentially executed on a DT1 CA. However, each of the other recipe instructions is assigned to another group G2, G3, G4. This indicates that each of the steps can be independently deployed to any of the device types as annotated, and can be executed in parallel when using different CAs in parallel. RI3 can be deployed to a DT1 CA, DT2 CA or DT4 CA. When deployed to a DT2 CA or DT4 CA it can be executed in parallel to RI1, RI2. RI4 can be deployed to a DT1 CA and a DT2 CA. When deployed to a DT2 CA it can be executed in parallel to RI1, RI2, and in parallel to RI3 in case RI3 is deployed to a DT4 CA. That is, the generic program listing PLg of the second implementation includes the information which is needed to determine different execution options with different levels of parallelization.

In such a generic program listing, the program analyzer can identify execution options, such as EO1, EO2, for the recipe program file in accordance with the annotations of the recipe instructions. For example, if the parallelization constraint is a time constraint, the program analyzer can construct all possible execution options for PLg, compute the total food processing time for each of the execution options, and finally select the execution option which has the best match with the time constraint in accordance with the matching rules. In the example of FIG. 3B, two of the determined execution options are shown by example (EO1, EO2). EO1 corresponds to PL1 of FIG. 3A, and EO2 corresponds to PL2 of FIG. 3B. The overall processing time for the sequential EO1 (RI1 to RI4 executed by DT1 CA) is TEO1=T1+T2+T3+T4+T5. For EO2, the program analyzer determines that RI3, RI4 can be executed in parallel with RI1, RI2 because they do not belong to the same grouping. Therefore, the overall processing time for the parallel EO2 is TEO2=max((T1+T2),(T3'+T4'))+T5. The same computation exercise is performed for all other possible execution options and finally the selector selects the best matching execution option in accordance with the matching rules.

With regard to a support-level constraint, the program analyzer compares the degree of parallelization (also referred to as the degree of automation) of the determined execution options and selects the execution option with the best match with the given support-level constraint. The degree of parallelization corresponds to the depth of parallelization in terms of parallel use of multiple CAs. For example, EO1 performs RI1 to RI4 on a DT1 CA and can perform RI5 in parallel on a DT3 CA. That is, the degree of parallelization for EO1 is 2 (using two CAs in parallel). For EO2, the DT1 CA performs RI1, R2 in parallel with the DT2 CA (performing RI3, RI4), and in parallel with the DT3 CA (performing RI5). That is, the degree of parallelization for EO2 is 3 (using three CAs in parallel). The execution option corresponding do PL4 of FIG. 3A has a degree of parallelization of 4 (using four CAs in parallel).

Based on a flexibility-level constraint, the system can adjust the level of specialized cooking apparatuses which are used in parallel to a multi-function cooking apparatus. In this example, it is assumed that a flexibility constraint "crispy" is retrieved from the user profile. Assuming further that DT1 specifies a multi-function cooking apparatus, DT2 specifies a support apparatus for the DT1 CA (e.g., with reduced functional scope but compatibility as described earlier), DT3 specifies an oven and DT4 specifies a pan in combination with an induction stove. Assuming further that RI4 is a recipe instruction for frying a piece of meat, and that the DT4 CA is flagged in the recipe program file as a specialized cooking apparatus with regard to the frying function to deliver a "crispy" frying result. The reason may be that a more "crispy" frying result can be achieved with the specialized DT4 CA than with the multi-function DT2 CA. In this case, the execution options which correspond to PL3 and PL4 are ranked with a higher flexibility-level than the execution options corresponding to PL1 and PL2 of FIG. 3A. If the oven (DT3) and the pan (DT4) contribute one count to the flexibility-level of an execution option, then PL1 and PL2 would result in a flexibility-level of 1 whereas PL3 and PL4 result in a flexibility-level of 2.

In general, recipe instructions which can use alternative cooking apparatuses for execution may be annotated with flexibility-level annotations with regard to respective specialized cooking apparatuses. If there is a match of such an annotation with a corresponding user parallelization constraint, the associated execution options which make use of the specialized cooking apparatus is ranked with a higher flexibility score (flexibility-level).

In the above example, the parallelization constraint "crispy" is a flexibility-level constraint that matches the execution options PL3 and PL4. The selector has now to decide whether to deploy execution option PL3 or PL4 which have the same flexibility score. The selector may simply use the first execution option which provides a best match. In a more sophisticated solution, a user may define primary and secondary parallelization constraints. For example, the primary constraint may be the flexibility-level constraint and the secondary constraint may be the time constraint. If the secondary constraint specifies that the user prefers a slow cooking procedure, then the selector would evaluate the PL3 and PL4 options with regard to the time constraint to make the final selection. The execution option with the longer food processing time would finally be selected.

Figures 4, 5:
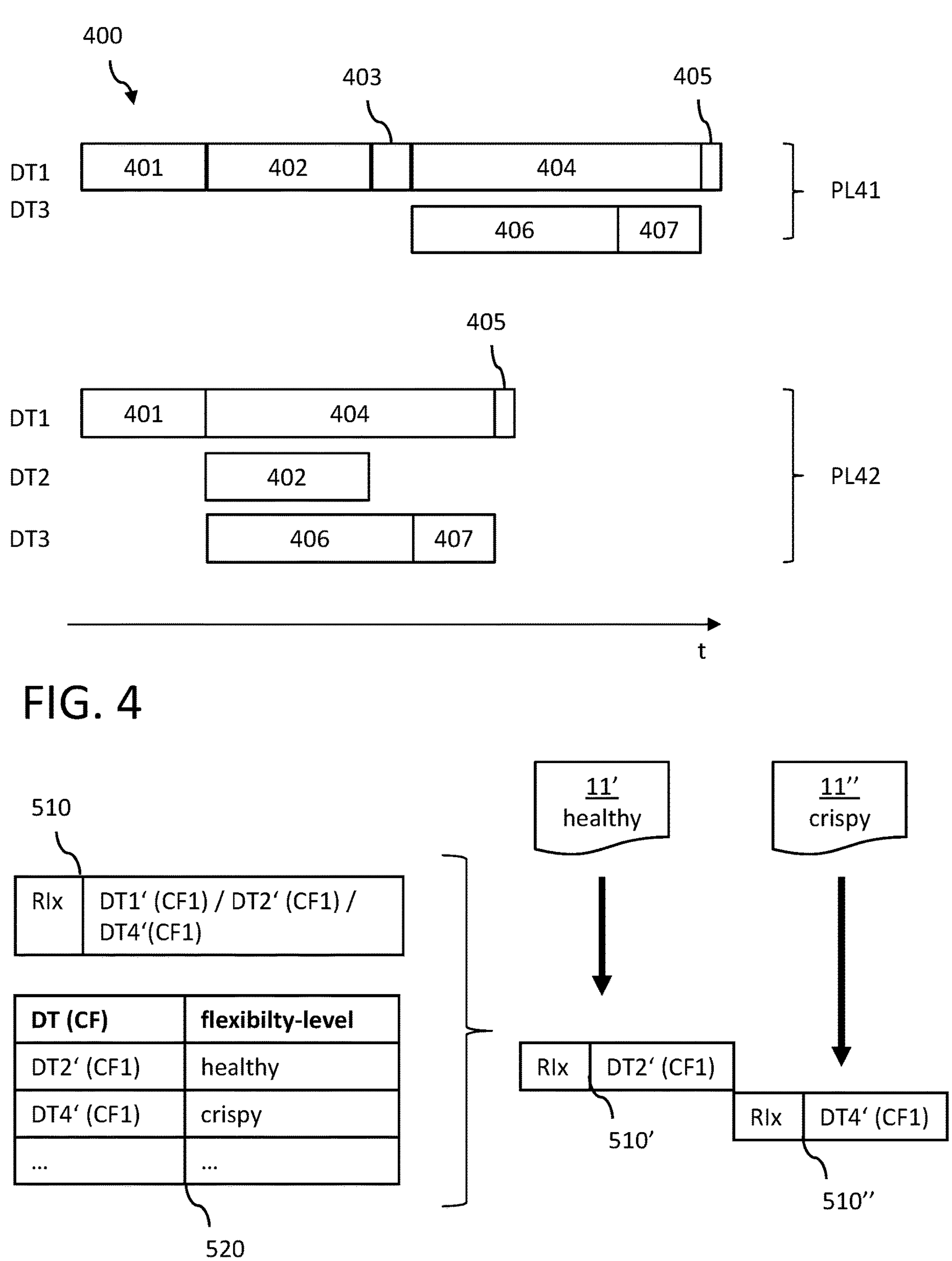
FIG. 4 illustrates execution times for two alternative recipe program listings with different levels of parallelization.
FIG. 5 illustrates an example for executing an execution option in accordance with a flexibility-level constraint.

FIG. 4 illustrates a recipe program file 400 with two examples of alternative program listing PL41, PL42 for preparing "chicken pizzaiola with celeriac-potato puree". In the example, PL41 uses a DT1 CA and, in parallel, a DT3 CA. PL42 has a higher degree of parallelization because it further uses a DT2 CA in parallel. As a result, the total food processing time for PL41 amounts to 77 min, whereas the total food processing time for PL42 only amounts to 52 min. The sections 401 to 407 represent the execution time t for groups of recipe instructions as indicated in the detailed program listing examples below. Examples of possible parallelization constraint annotations for the two alternative listings are given in Table 1.

TABLE 1 parallelization constraint examples

| Parallelization constraint type | PL41 | PL42 |
|---|---|---|
| time | slow | fast |
| time | >1 hr | <1 hr |
| support-level | low | high |
| support-level | 2 | 3 |
| flexibility-level | 1 | 1 |
| flexibility-level | healthy | crispy |

Details of the recipe instructions of PL42 are given in the following listing. Recipe instructions related to cooking steps performed by the respective cooking apparatus (highlighted in bold letters) include the operating parameter settings for the respective cooking apparatus in the italicized parts of the corresponding recipe instruction. Other recipe instructions relate to manual cooking steps to be performed by the cooking user. The reference numbers of the recipe sections in FIG. 4 are denoted in brackets behind corresponding recipe instructions. Each recipe section includes one or more recipe steps (recipe instructions).

Example program listing for PL42 (total execution time: 52 min):

Recipe Instructions in Section 401 (Total Execution Time: 15 Min)

1) Place a bowl on DT1 CA mixing bowl lid, weigh in potatoes and Celeriac then set aside.
2) Place Edam in mixing bowl in DT1 CA and grate 10 sec/speed 5 until grated. Transfer to a bowl and set aside.
3) Place steam dish into position, weigh chicken breasts in steam dish, season with ½ tsp salt and pepper then set aside.
4) Place garlic, oil and onions in mixing bowl in DT1 CA, chop 5 sec/speed 5 then sauté 5 min/120° C./speed 1.

Recipe Instructions in Section 402, 404, 406, 407 (Total Parallel Execution Time: 35 Min)

5) Add tomatoes, vegetable stock, 1 tsp salt and sugar to mixing bowl in DT1 CA.
   Remove mixing bowl from DT1 CA and insert mixing bowl in DT2 CA.
   Place covered steam dish into position on DT2 CA and cook 20 min/steam/speed 1.
6) Meanwhile, make puree:
   Place second mixing bowl in DT1 CA—insert butterfly whisk.
   Place reserved potato and celeriac pieces, milk, butter and 1½ tsp salt in mixing bowl then cook 35 min/95° C./speed 2 until cooked.
   Meanwhile, preheat DT3 CA to 200° C.
   When DT2 CA rings, remove steam dish, place chicken breasts in a baking dish, cover with tomato sauce and sprinkle with reserved grated Edam and oregano.
   Bake in DT3 DA for 15 minutes (200° C.) or until cheese becomes golden brown.
7) Add nutmeg to mixing bowl in Thermomix and blend 30 sec/reverse/speed 3.5.
   Remove butterfly whisk Recipe Instructions in Section 405 (Total Execution Time: 2 Min)

8) Serve puree hot with the chicken.

In execution option PL42, sections 402 (DT2CA), 404 (DT1 CA), and 406, 407 (DT3 CA) are executed in parallel, thus leading to a reduced execution time in comparison to execution option PL41. Details of the recipe instructions of PL41 (sequential execution option) are given in the following listing (indicating recipe instructions of PL42 which become obsolete when not using a DT2 CA by appearing between two asterisks). The same notation is used as for PL42.

Example program listing for PL41 (total execution time: 77 min):

Recipe Instructions in Sections 401, 402, 403 (Total Execution Time: 40 Min)

1) Place a bowl on DT1 CA mixing bowl lid, weigh in potatoes and Celeriac then set aside. (401)
2) Place Edam in mixing bowl in DT1 CA and grate 10 sec/speed 5 until grated. Transfer to a bowl and set aside. (401)
3) Place steam dish into position, weigh chicken breasts in steam dish (DT1 CA), season with ½ tsp salt and pepper then set aside. (401)
4) Place garlic, oil and onions in mixing bowl in DT1 CA, chop 5 sec/speed 5 then sauté 5 min/120° C./speed 1. (401)
5) Add tomatoes, vegetable stock, 1 tsp salt and sugar to mixing bowl in DT1 CA. (402)
   Remove mixing bowl from DT1 CA and insert in DT2 CA.
   Place covered steam dish into position on DT1 CA and cook 20 min/steam/speed 1. (402)

6.a) When DT1 CA rings, remove steam dish, place chicken breasts in a baking dish, cover with tomato sauce and sprinkle with reserved grated Edam and oregano. (402)
6.b) Clean bowl (403)
6.c) Meanwhile, make puree (404)
   Place mixing bowl in DT1 CA insert butterfly whisk. (404)
   Place reserved potato and celeriac pieces, milk, butter and 1½ tsp salt in mixing bowl then cook 35 min/95° C./speed 2 until cooked. (404)
   Meanwhile, preheat DT3 CA to 200° C. (406)
   When DT2 CA rings, remove steam dish, place chicken breasts in a baking dish, cover with tomato sauce and sprinkle with reserved grated Edan and oregano.
   Bake in DT3 CA for 15 minutes (200° C.) or until cheese becomes golden brown. (407)

Recipe Instructions in Section 405 (Total Execution Time: 2 Min)

7) Add nutmeg to mixing bowl in DT1 CA and blend 30 sec/reverse/speed 3.5. (405)
   Remove butterfly whisk (405)
8) Serve puree hot with the chicken. (405)

It is to be noted that in the parallel listing PL42 the "Clean bowl" step 403 can be omitted because two different bowls are used for DT1 CA and DT2 CA. Therefore, there is no cleaning step necessary for the DT1 bowl as the clean DT2 CA bowl is used instead. In the alternative implementation of the recipe program file where specific execution options are generated dynamically from a generic recipe program listing, the program analyzer 120 (cf. FIG. 1) can use predefined partitioning rules 150 to eliminate steps from the generic program which become unnecessary for a respective execution option. For example, the cleaning step may be defined as unnecessary when two CAs with two bowls are used in parallel for the respective recipe instructions. In such a case the partitioning module 124 generates a corresponding partition of the recipe program with the instructions for the DT2 CA without such a cleaning step.

In case a time or support-level parallelization constraint is given in accordance with the examples in column PL41 of table 1, the selector selects the sequential execution option (sequential with regard to DT1 CA) using only the DT1 and DT3 CAs. In case such constraint is given in accordance with the examples in column PL42 of table 1, the selector selects the parallel execution option using DT1 and DT2 CAs in parallel (and of course the DT3 CA in parallel as already in PL41). In case the parallelization constraint is the flexibility-level constraint "1" of table 1, no preferred execution can be determined because both program listings use "1" specialized cooking device and the selector selects either PL41 or PL42 unless one of the other parallelization constraints is used as a secondary constraint. However, if the flexibility-level constraint is "healthy" or "crispy", the selector would select the correspondingly annotated program listing. Annotations for selecting execution options in accordance with flexibility-level constraints do not necessarily need to be implemented at the program listing level. Rather, as described in the example of FIG. 5, they may be associated directly with the cooking functions of specialized cooking apparatuses.

FIG. 5 illustrates, by an example of a generic recipe instruction 510, how a flexibility-level constraint may influence the selection of corresponding execution option. The recipe program file in this example includes a generic recipe instruction 510 which describes that the cooking function CF1 in response to executing the recipe instruction RIx can be performed by cooking apparatuses of the device types DT1', DT2', and DT4'. In the example it is assumed that RIx relates to the "searing of a piece of meat". It is further assumed that the registered DT1' CA is a standard multi-function cooking apparatus which can perform the cooking function "searing" CF1 in a heated bowl which supports frying and searing. It is further assumed that the registered DT2' CA is high-temperature grill which is specialized cooking apparatus to perform the searing function CF1 in a particular healthy manner because no fat or oil is required when using the DT2' CA. This property of the DT2' CA may be stored in a flexibility-level table 520.

In general, table 520 can store for each specialized cooking apparatus and cooking function DT(CF) a corresponding flexibility-level value which indicates an advantageous use of the respective specialized cooking apparatus. For example, table 520 may be part of the CA registry 140 (cf. FIG. 1), or it may be a provided by the recipe store 280. Other storage locations are possible, too. In the example, DT2'(CF1) is flagged with the flexibility-level "healthy".

It is further assumed that the DT4' CA is an oven with a steaming function which allows to execute "searing" CF1 in a way that the food product result develops a crispy crust. Therefore, DT4'(CF1) is flagged with the flexibility-level value "crispy" in table 520. It is to be noted that table 520 has no entries for standard cooking devices, such as the DT1 CA. Only specialized cooking apparatuses which can distinguish the cooking result provided by the specialized apparatus from those results provided by a standard cooking apparatus are flagged accordingly in table 520.

The recipe analyzer 120 (cf. FIG. 1), can now identify the various execution options for the recipe program including the RIx recipe instruction. The selector will then select the execution option which complies with the respective parallelization constraint 11', 11". In the example, the parallelization constraint 11' indicates that the user prefers "healthy" cooking in which case the selector would go with the execution option 510' RIx|DT2'(CF1). The parallelization constraint 11" may indicate that another user prefers "crispy" cooking in which case the selector would go with the execution option 510" RIx|DT4'(CF1). That is, the degree of parallelization would be increased by one by selecting an execution option which includes a specialized cooking apparatus in accordance with the flexibility-level constraint of the user (instead of simply using the standard DT1' CA).

Figure 6:
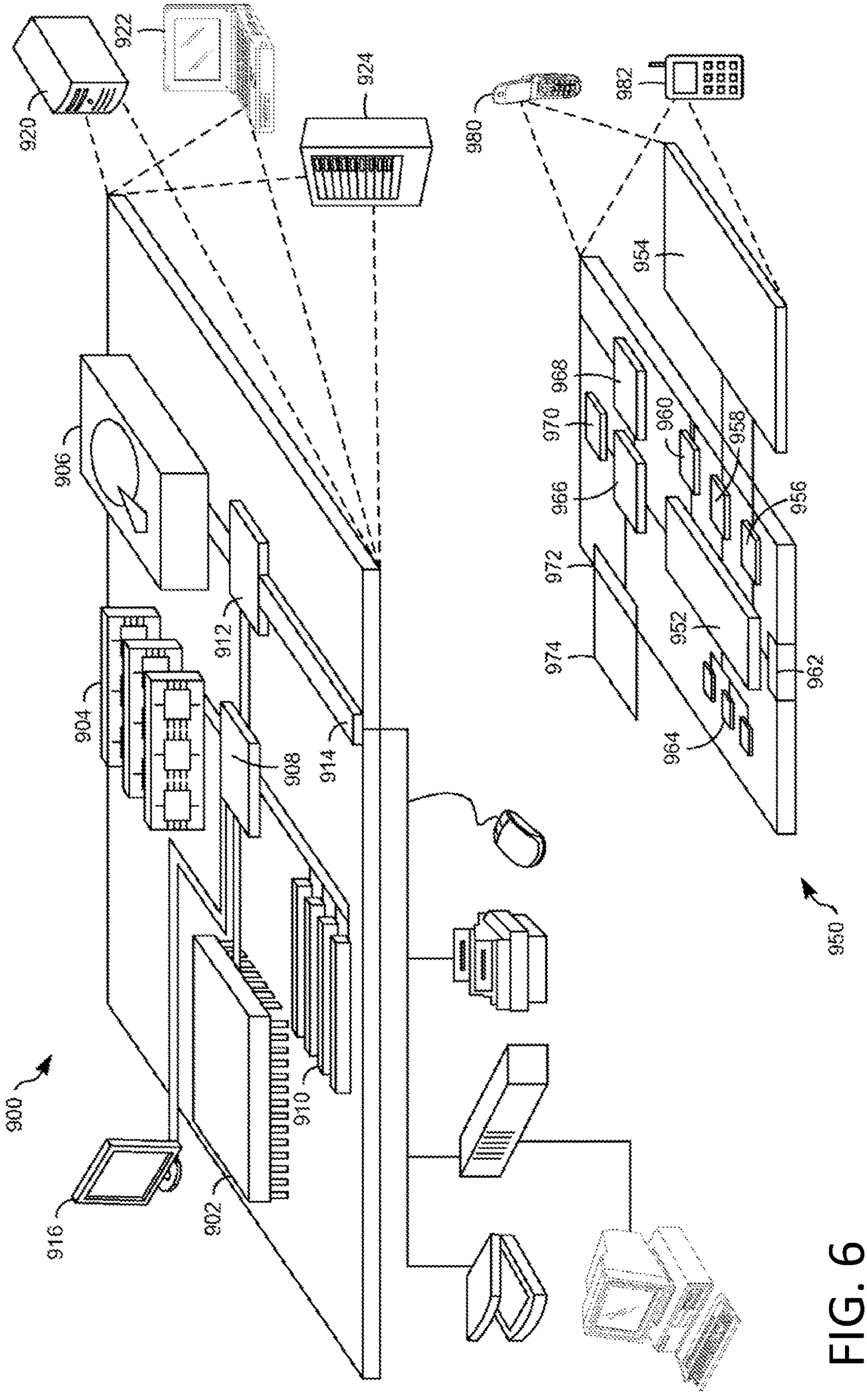
FIG. 6 is a diagram that shows an example of a generic computer device and a generic mobile computer device, which may be used in example embodiments.

FIG. 6 is a diagram that shows an example of a generic computer device 900 and a generic mobile computer device 950, which may be used with the techniques described here. Computing device 900 relates in an exemplary embodiment to the control system 100 (cf. FIG. 1). Computing device 950 is intended to represent various forms of mobile devices, such as personal digital assistants, cellular telephones, smart phones, and other similar computing devices. Such front ends may also be implemented as integral parts of the cooking devices. In an exemplary embodiment of this disclosure the computing device 950 may serve as a frontend control device of the control system 900 which can be used by the user to logon to the control system and/or to provide parallelization constraints as input. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low-speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, ZigBee, WLAN, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, ZigBee or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the description.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for recipe instruction provisioning in relation to registered cooking apparatuses in a cooking environment of a cooking user for preparing a food product, each registered cooking apparatus being registered in a cooking apparatus registry as having a particular device type, the method comprising:

receiving, at a processor and from a recipe database, a recipe program file with recipe instructions readable by the processor for preparing the food product, wherein the recipe instructions are configured to be executed by one or more cooking apparatuses in that the recipe instructions include annotations specifying one or more device types suitable to execute the recipe instructions in that the annotations include metadata specifying the one or more device types that are appropriate to execute a corresponding recipe instruction of the recipe instructions;

receiving a parallelization constraint associated with the cooking user, the parallelization constraint configured to influence a degree of parallelization of the food preparation with regard to parallel use of the registered cooking apparatuses;

determining one or more subsets of the registered cooking apparatuses by identifying execution options for the recipe instructions on said one or more subsets of the registered cooking apparatuses resulting in a recipe execution in compliance with the parallelization constraint, wherein each identified execution option of the execution options corresponds to a recipe instruction sequence that can be executed by one or more of the registered cooking apparatuses identified by respective ones of the annotations, wherein the annotations are used as a filter criterion to eliminate execution options for the recipe program that use device types not included in the registered cooking apparatuses or in the cooking environment;

selecting an execution option of the execution options providing a best match with the received parallelization constraint in accordance with predefined matching rules, wherein the best match is determined by comparing the received parallelization constraint with respective ones of the annotations of recipe instructions of each execution option to identify an equality between the received parallelization constraint and the execution option, or, in case no equality is identified, by selecting respective annotations of recipe instructions of the execution option as being closest to the received parallelization constraint in compliance with the predefined matching rules, wherein the selected execution option enables at least one of (i) reduced overall preparation time or (ii) fewer manual intervention steps compared to sequential execution on a single apparatus; and transmitting, by a communications link, recipe deployment instructions to the one or more subsets of the registered cooking apparatuses of the selected execution option in accordance with corresponding annotations for preparing the food product, the recipe deployment instructions conforming to the recipe instruction sequence, and thereby causing the registered cooking apparatuses of the selected subsets to execute the partitioned recipe instructions in parallel.

2. The method of claim 1, wherein the parallelization constraint specifies any of the following: a user defined preparation time for the food product, a user defined device support-level specifying a degree of automation for semi-automated cooking, and a user defined device flexibility-level specifying potential use of special cooking devices.

3. The method of claim 1, wherein the recipe program file includes predefined alternative program listings of the recipe program, with each alternative program listing related to a particular combination of cooking apparatuses with corresponding device type annotations, wherein determining one or more subsets of the registered cooking apparatuses comprises selecting the alternative program listings with combinations that only include registered cooking apparatuses.

4. The method of claim 3, wherein the alternative program listings in the recipe program file are annotated with corresponding parallelization constraint metadata in accordance with parallelization constraint preferences of stored user profiles, the parallelization constraint metadata including at least one of: a representation of a predicted preparation time for the alternative program listing, a representation of an associated support-level, and a representation of an associated flexibility-level.

5. The method of claim 1, wherein the recipe program file has a program listing which indicates groupings of recipe instructions, with the recipe instructions of a particular grouping to be executed by one cooking apparatus in accordance with the corresponding annotations, wherein identifying execution options for the recipe instructions comprises one of: computing preparation times for various execution options executed by various combinations in accordance with the annotations, determining degrees of automation for various execution options executed by various combinations in accordance with the annotations, and determining degrees of device flexibility for various execution options executed by various combinations in accordance with the annotations.

6. The method of claim 5, wherein the identified execution options are mapped to parallelization constraint preferences of stored user profiles in accordance with predefined mapping rules.

7. The method of claim 1, wherein the parallelization constraint is received via an input from said user, or wherein the parallelization constraint is retrieved from a stored user profile of said user.

8. A computer program product for recipe instruction provisioning in relation to registered cooking apparatuses in a cooking environment of a cooking user for preparing a food product, each registered cooking apparatus being registered in a cooking apparatus registry as having a particular device type, the computer program product comprising a non-transitory computer readable storage medium storing computer readable instructions that, when loaded into a memory of a computing device and executed by at least one processor of the computing device, cause the computing device to:

receive, at a processor and from a recipe database, a recipe program file with recipe instructions readable by the processor for preparing the food product, wherein the recipe instructions are configured to be executed by one or more cooking apparatuses in that the recipe instructions include annotations specifying one or more device types suitable to execute the recipe instructions in that the annotations include metadata specifying the one or more device types that are appropriate to execute a corresponding recipe instruction of the recipe instructions;

receive a parallelization constraint associated with the cooking user, the parallelization constraint configured to influence a degree of parallelization of the food preparation with regard to parallel use of the registered cooking apparatuses;

determine one or more subsets of the registered cooking apparatuses by identifying execution options for the recipe instructions on said one or more subsets of the registered cooking apparatuses resulting in a recipe execution in compliance with the parallelization constraint, wherein each identified execution option of the execution options corresponds to a recipe instruction sequence that can be executed by one or more of the registered cooking apparatuses identified by respective ones of the annotations, wherein the annotations are used as a filter criterion to eliminate execution options for the recipe program that use device types not included in the registered cooking apparatuses or in the cooking environment;

select an execution option of the execution options providing a best match with the received parallelization constraint in accordance with predefined matching rules, wherein the best match is determined by comparing the received parallelization constraint with respective ones of the annotations of recipe instructions of each execution option to identify an equality between the received parallelization constraint and the execution option, or, in case no equality is identified, by selecting respective annotations of recipe instructions of the execution option as being closest to the received parallelization constraint in compliance with the predefined matching rules, wherein the selected execution option enables at least one of (i) reduced overall preparation time or (ii) fewer manual intervention steps compared to sequential execution on a single apparatus; and transmitting, by a communications link, recipe deployment instructions to the one or more subsets of the registered cooking apparatuses of the selected execution option in accordance with corresponding annotations for preparing the food product, the recipe deployment instructions conforming to the recipe instruction sequence, and thereby causing the registered cooking apparatuses of the selected subsets to execute the partitioned recipe instructions in parallel.

9. The computer program product of claim 8, wherein the parallelization constraint specifies any of the following: a user defined preparation time for the food product, a user defined device support-level specifying a degree of automation for semi-automated cooking, and a user defined device flexibility-level specifying potential use of special cooking devices.

10. The computer program product of claim 8, wherein the recipe program file includes predefined alternative program listings of the recipe program, with each alternative program listing related to a particular combination of cooking apparatuses with corresponding device type annotations, wherein the computer readable instructions, when loaded into the memory of the computing device and executed by at least one processor of the computing device, cause the computing device to determine the one or more subsets of the registered cooking apparatuses by selecting the alternative program listings with combinations that only include registered cooking apparatuses.

11. The computer program product of claim 10, wherein the alternative program listings in the recipe program file are annotated with corresponding parallelization constraint metadata in accordance with parallelization constraint preferences of stored user profiles, the parallelization constraint metadata including at least one of: a representation of a predicted preparation time for the alternative program listing, a representation of an associated support-level, and a representation of an associated flexibility-level.

12. The computer program product of claim 8, wherein the recipe program file has a program listing which indicates groupings of recipe instructions, with the recipe instructions of a particular grouping to be executed by one cooking apparatus in accordance with the corresponding annotations, wherein execution options for the recipe instructions are identified by one of: computing preparation times for various execution options executed by various combinations in accordance with the annotations, determining degrees of automation for various execution options executed by various combinations in accordance with the annotations, and determining degrees of device flexibility for various execution options executed by various combinations in accordance with the annotations.

13. The computer program product of claim 12, wherein the identified execution options are mapped to parallelization constraint preferences of stored user profiles in accordance with predefined mapping rules.

14. A computer system for recipe instruction provisioning in relation to registered cooking apparatuses in a cooking environment of a cooking user for preparing a food product, each registered cooking apparatus being registered in a cooking apparatus registry as having a particular device type, the system comprising at least one memory storing instructions and at least one processor configured to load and execute the instruction to thereby:

receive, at the processor and from a recipe database, a recipe program file with recipe instructions readable by the processor for preparing the food product, wherein the recipe instructions are configured to be executed by one or more cooking apparatuses in that the recipe instructions include annotations specifying one or more device types suitable to execute the recipe instructions in that the annotations include metadata specifying the one or more device types that are appropriate to execute a corresponding recipe instruction of the recipe instructions;

receive a parallelization constraint associated with the cooking user, the parallelization constraint configured to influence a degree of parallelization of the food preparation with regard to parallel use of the registered cooking apparatuses;

determine one or more subsets of the registered cooking apparatuses by identifying execution options for the recipe instructions on said one or more subsets resulting in a recipe execution in compliance with the parallelization constraint, wherein each identified execution option of the execution options corresponds to a recipe instruction sequence that can be executed by one or more of the registered cooking apparatuses identified by respective ones of the annotations, wherein the annotations are used as a filter criterion to eliminate execution options for the recipe program that use device types not included in the registered cooking apparatuses or in the cooking environment, select an execution option of the execution options providing a best match with the received parallelization constraint in accordance with predefined matching rules, wherein the best match is determined by comparing the received parallelization constraint with respective ones of the annotations of recipe instructions of each execution option to identify an equality between the received parallelization constraint and the execution option, or, in case no equality is identified, by selecting respective annotations of recipe instructions of the execution option as being closest to the received parallelization constraint in compliance with the predefined matching rules, wherein the selected execution option enables at least one of (i) reduced overall preparation time or (ii) fewer manual intervention steps compared to sequential execution on a single apparatus; and transmit, by a communications link, recipe deployment instructions to the one or more subsets of the registered cooking apparatuses of the selected execution option in accordance with corresponding annotations for preparing the food product, the recipe deployment instructions conforming to the recipe instruction sequence, and thereby causing the registered cooking apparatuses of the selected subsets to execute the partitioned recipe instructions in parallel.

15. The system of claim 14, wherein the parallelization constraint specifies any of the following: a user defined preparation time for the food product, a user defined device support-level specifying a degree of automation for semi-automated cooking, and a user defined device flexibility-level specifying potential use of special cooking devices.

16. The system of claim 14, wherein the recipe program file includes predefined alternative program listings of the recipe program, with each alternative program listing related to a particular combination of cooking apparatuses with corresponding device type annotations, wherein the system is further configured to:

determine one or more subsets of the registered cooking apparatuses by selecting the alternative program listings with combinations that only include registered cooking apparatuses.

17. The system of claim 16, wherein the alternative program listings in the recipe program file are annotated with corresponding parallelization constraint metadata in accordance with parallelization constraint preferences of stored user profiles, the parallelization constraint metadata including at least one of: a representation of a predicted preparation time for the alternative program listing, a representation of an associated support-level, and a representation of an associated flexibility-level.

18. The system of claim 14, wherein the recipe program file has a program listing which indicates groupings of recipe instructions, with the recipe instructions of a particular grouping to be executed by one cooking apparatus in accordance with the corresponding annotations, wherein the system is further configured to:

identify execution options for the recipe instructions by one of the following: computing preparation times for various execution options executed by various combinations in accordance with the annotations, determining degrees of automation for various execution options executed by various combinations in accordance with the annotations, and determining degrees of device flexibility for various execution options executed by various combinations in accordance with the annotations.

19. The system of claim 18, wherein the identified execution options are mapped to parallelization constraint preferences of stored user profiles in accordance with predefined mapping rules.

20. The system of claim 14, wherein the parallelization constraint is received via an input from said user, or wherein the parallelization constraint is retrieved from a stored user profile of said user.

* * * * *